US012772178B2

(12) United States Patent
Saghir et al.

(10) Patent No.: US 12,772,178 B2
(45) Date of Patent: Oct. 20, 2026

(54) SYSTEMS AND METHODS FOR CELL POWER OPTIMIZATION USING KEY PERFORMANCE INDICATORS

(71) Applicant: Verizon Patent and Licensing Inc., Basking Ridge, NJ (US)

(72) Inventors: Amir Saghir, Frisco, TX (US); Said Hanbaly, Prosper, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 467 days.

(21) Appl. No.: 18/167,367

(22) Filed: Feb. 10, 2023

(65) Prior Publication Data

US 2024/0276395 A1 Aug. 15, 2024

(51) Int. Cl.
*H04W 52/24* (2009.01)

(52) U.S. Cl.
CPC ................................. *H04W 52/244* (2013.01)

(58) Field of Classification Search
CPC ............. H04W 52/243; H04W 52/244; H04W 52/24; H04W 52/241
See application file for complete search history.

(56) References Cited

U.S. PATENT DOCUMENTS

2013/0102309 A1* 4/2013 Chande ............... H04W 52/325 455/435.1
2013/0171985 A1* 7/2013 Carter ................... H04W 52/24 455/423
2017/0257787 A1* 9/2017 Regueira Caumel ........................ H04W 24/10
2018/0184344 A1* 6/2018 Periyasamy .......... H04L 5/0057
2018/0310258 A1* 10/2018 Goria .................... H04W 24/02
2019/0261197 A1* 8/2019 Bellamkonda ...... H04L 41/0823
2022/0191798 A1* 6/2022 Maggi ................... H04W 52/10
2022/0256474 A1* 8/2022 Myron ................ H04W 52/223

FOREIGN PATENT DOCUMENTS

EP 3606189 A1 * 5/2020
WO WO 2014173316 A1 * 10/2014

* cited by examiner

*Primary Examiner* — Keith Ferguson

(57) ABSTRACT

In some implementations, a network device may determine, based on powering up the network device, a first transmit power level associated with the cell. The network device may monitor one or more key performance indicators (KPIs) associated with a coverage of the cell. The network device may determine that at least one KPI, of the one or more KPIs, satisfies a threshold. The network device may determine, based on the at least one KPI satisfying the threshold, that the first transmit power level should be adjusted. The network device may adjust the first transmit power level, resulting in a second transmit power level associated with the cell.

20 Claims, 16 Drawing Sheets

SYSTEMS AND METHODS FOR CELL POWER OPTIMIZATION USING KEY PERFORMANCE INDICATORS

BACKGROUND

A user equipment (UE) may establish a connection to a core network via a network device. The UE may communicate with the network device via downlink communications (e.g., communications from the network device to the UE) and uplink communications (e.g., communications from the UE to the network device). A network device may be associated with a coverage area, sometimes referred to as a cell. A size of a cell (e.g., a coverage area) may differ according to a type of network device being employed (e.g., a macro device, a femto device, a pico device, or a similar device), a transmit power level implemented by the network device, environmental conditions, and other factors.

DETAILED DESCRIPTION OF EXAMPLE EMBODIMENTS

Figure 1A:
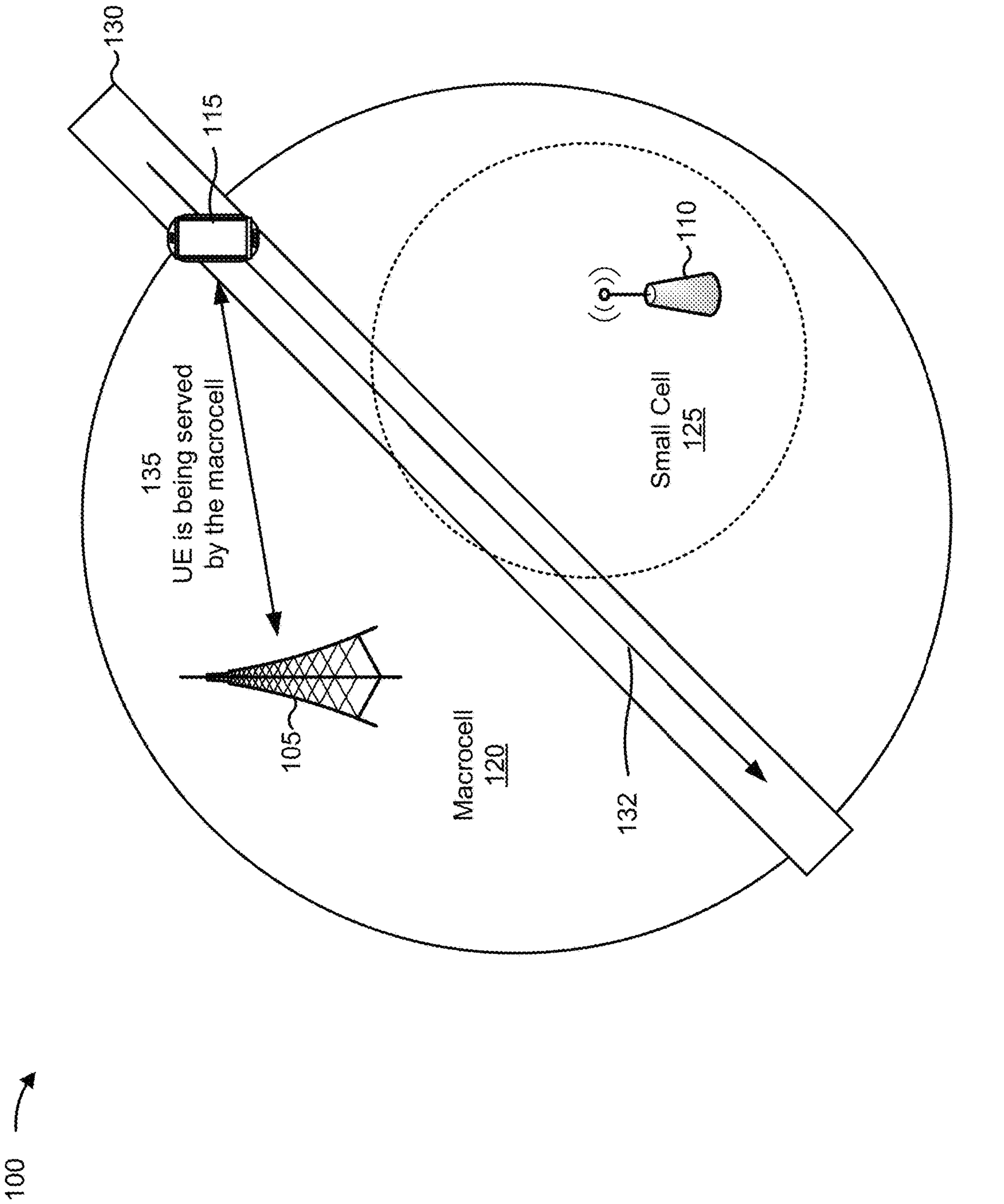
FIGS. 1A-1E are diagrams of an example associated with various cells of a wireless network.

The following detailed description of example implementations refers to the accompanying drawings. The same reference numbers in different drawings may identify the same or similar elements.

A wireless communication device, such as a user equipment (UE) or a similar device, may communicate with a network device in a wireless network. A network device may include a New Radio (NR) or fifth generation (5G) network device (sometimes referred to as a gNodeB (gNB)), a Long Term Evolution (LTE) or fourth generation (4G) network device (sometimes referred to as an eNodeB (eNB)), or a similar network device. Each network device may provide communication coverage for a particular area, sometimes referred to as a cell. A network device may be built to provide coverage to a relatively large geographic area, sometimes referred to as a macrocell, or to a smaller area, sometimes referred to as a small cell, a microcell, a picocell, a femtocell, a private cell, an onsite cell, or a similar cell. For example, a macro network device may be associated with a large antenna array and a high transmit power, providing broad coverage to many users within a macrocell, while a femto, pico, private, and/or onsite network device may be associated with a smaller antenna array and/or a lower transmit power than a macro network device and may provide coverage to a limited number of subscribers located within a particular building, located on a particular premises, or the like.

Small cell densification is an integral part of deploying 4G/5G technology to provide good indoor and outdoor cellular coverage. Currently, once deployed, small cells control their own transmit power based on the interference of the neighboring cells. They do not adjust parameters based on any KPIs or other performance metrics. Certain cells in a wireless network, especially after cell densification, may operate near to one another, which, in some cases, may cause service disruptions at a UE and/or may otherwise result in a decreased quality of experience for a UE. For example, in instances in which a coverage of a small cell overlaps with a coverage of a macrocell, a UE may frequently move in and out of coverage of the small cell while remaining in the coverage of the macrocell. This may result in the UE performing multiple handover procedures between the small cell and the macrocell and/or the UE moving out of coverage of the small cell prior to completing a handover procedure with the small cell, resulting in service disruptions at the UE. Moreover, in aspects in which a small cell is deployed near a macrocell but in such a way that the coverage provided by the small cell does not overlap with coverage provided by the macrocell (e.g., when the small cell is deployed in such a way that a coverage gap exists between the small cell and a neighboring macrocell), a UE that is being served by the one cell may experience service disruption and/or radio link failure when moving from the coverage of the one cell to a coverage of the other cell. Accordingly, deploying a small cell near a macrocell and/or such that the small cell and macrocell have overlapping coverage areas may result in service disruptions at the UE and thus communication errors between the UE and the network device, leading to high power, computing, and network resource consumption to reestablish wireless communication sessions and/or correct communication errors.

Some implementations described herein enable improved quality of experience for UEs operating near multiple cells. In some implementations, a network device associated with a small cell may monitor one or more performance metrics, such as one or more key performance indicators (KPIs) associated with a coverage of the small cell. For example, the network device may monitor a KPI associated with a total number of handovers or of incomplete handover procedures performed by the small cell, a KPI associated with a number of radio link failures without a graceful connection release associated with the small cell, or a similar KPI. Based on the one or more performance metrics, the small cell may optimize its transmit power level in order to improve an end user experience. For example, the small cell may decrease the transmit power level in order to reduce an associated coverage area and thus reduce the number of handover procedures performed by the small cell, and/or the small cell may increase the transmit power level in order to increase an associated coverage area and thus reduce the number of radio link failures without a graceful connection release associated with the small cell. As a result, service disruptions and/or communication errors between the UE and the network device may be reduced, leading to an increased quality of experience at the UE and/or reduced power, computing, and network resource consumption that may otherwise be required to reestablish wireless communication sessions and/or correct communication errors.

FIGS. 1A-1E are diagrams of an example 100 associated with various cells of a wireless network. As shown in FIGS. 1A-1E, example 100 includes multiple network devices, such as a first network device 105 and a second network device 110, and a UE 115.

As shown in FIG. 1A, various network devices may provide coverage to UEs or similar devices as part of a wireless network. More particularly, in the depicted example, the first network device 105 may be associated with a macrocell 120, and the second network device 110 may be associated with a small cell 125. In that regard, the macro network device 105 may provide coverage to a broad geographic area and to a relatively large number of subscribers, and thus may be a base station, a disaggregated portion of a base station according to an open radio access network (O-RAN) architecture (e.g., a radio unit (RU), a distributed unit (DU), and/or a central unit (CU)), an eNB, a gNB, or a similar device. The second network device 110 may provide coverage to a relatively small number of subscribers within a building, on a certain premises, in a small geographic area, or the like, and, in some cases, may be associated with a small cell (e.g., a microcell, a picocell, a femtocell, an onsite cell, a private cell, and/or a similar cell). In some cases, the size of a respective cell, and thus a coverage area associated with each network device 105, 110, may be proportional to a transmit power level associated with the respective network device 105, 110. In that regard, and as shown in FIG. 1A, the first network device 105 may transmit using a higher transmit power level than the second network device 110, and thus the macrocell 120 may be larger (e.g., may be associated with a larger coverage area) than the small cell 125.

In some cases, network devices 105 and/or 110 may adjust a transmit power level based on environmental conditions or other factors. For example, the second network device 110 may control a transmit power level, and thus may alter the coverage area associated with the small cell 125, based on a measured interference level associated with neighboring cells. For example, upon powering up, the second network device 110 may measure an interference level associated with neighboring cells (e.g., the macrocell 120 and/or any other neighboring cells), and may determine a transmit power level to be used based on the measured interference level.

Figure 1B:
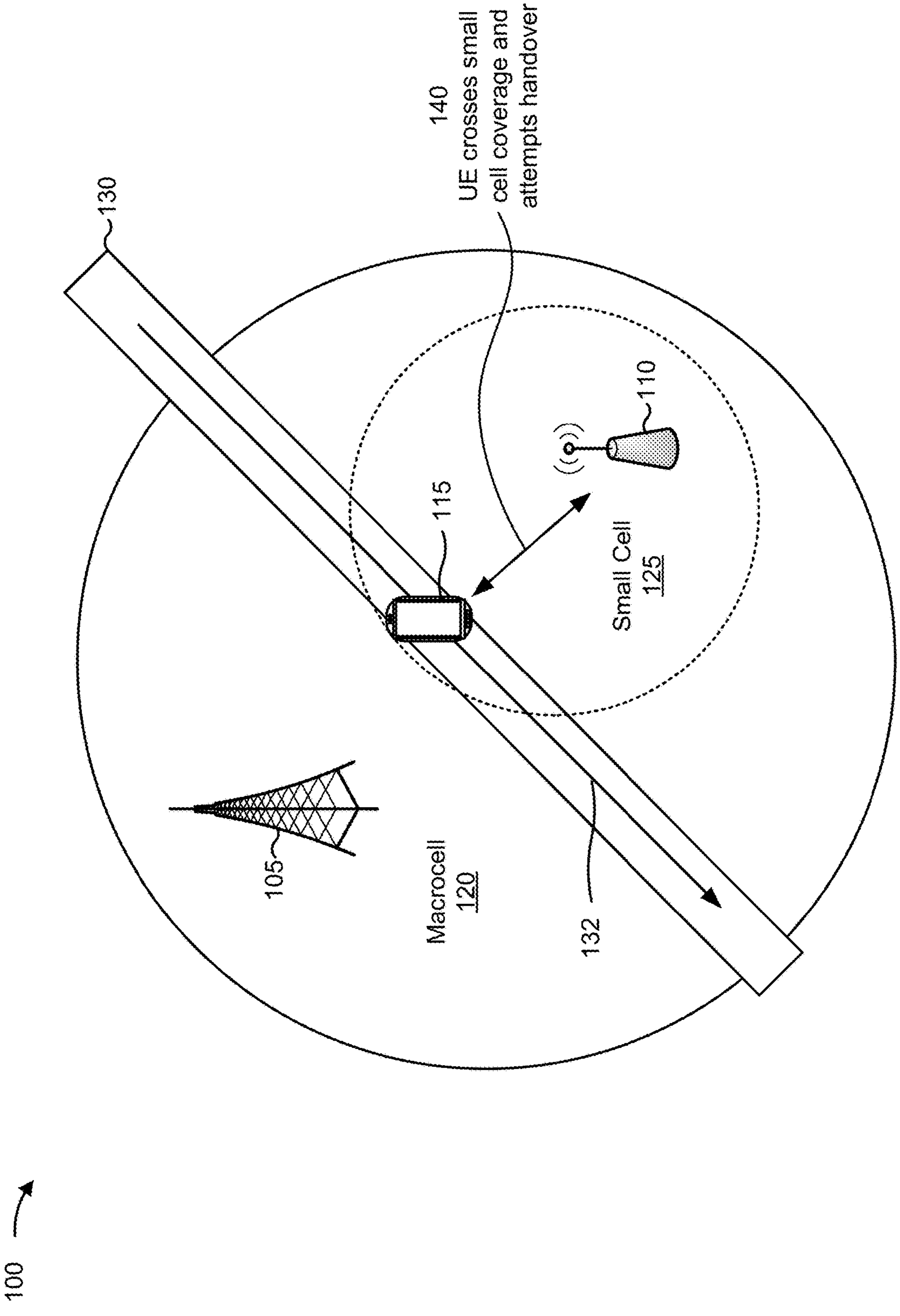
Figure 1C:
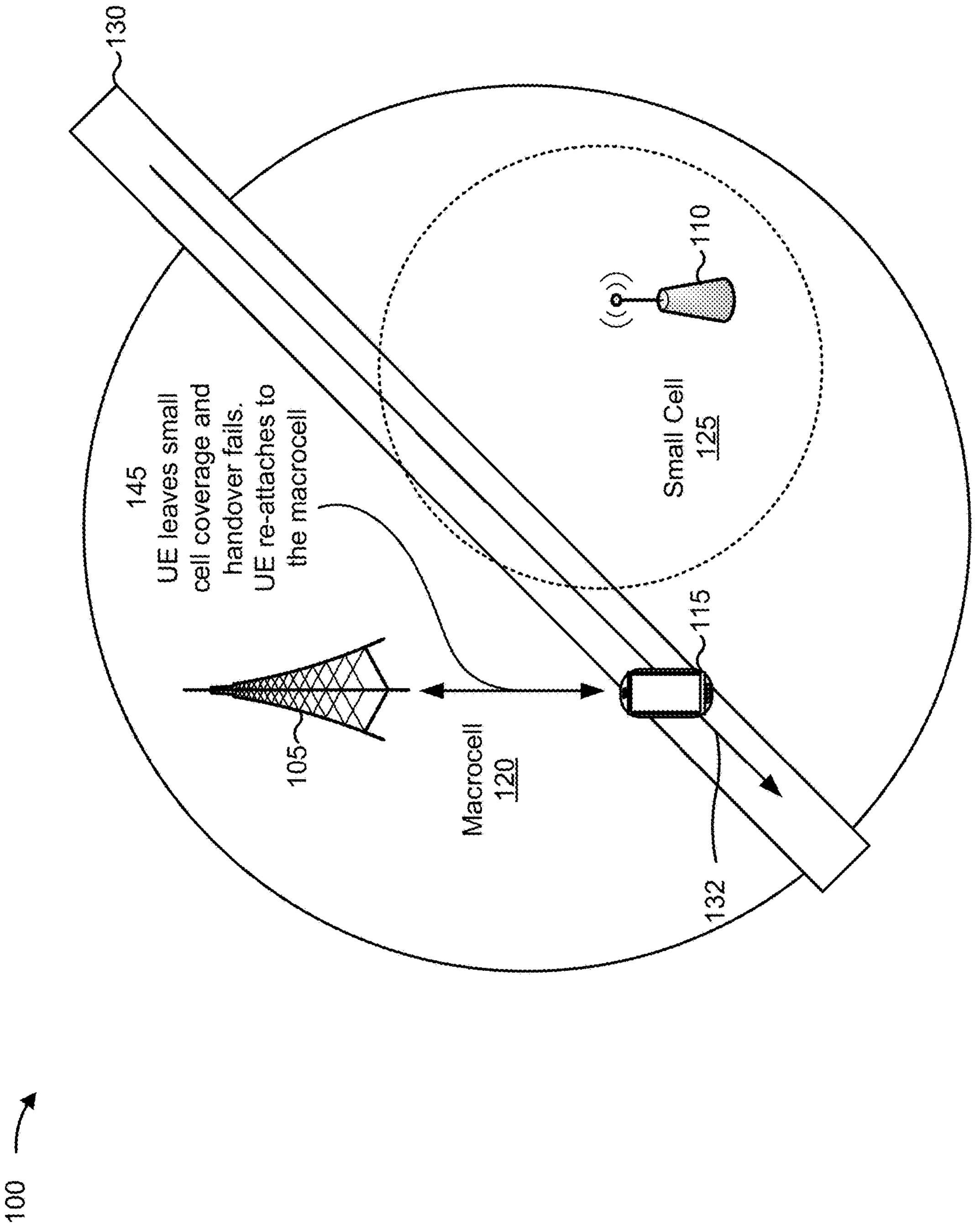

In some examples, this initially determined transmit power level may result in poor network coverage for the UE 115 and/or a poor customer experience associated with the UE 115 as it traverses road 130. For example, the coverage provided by the second network device 110 and/or the small cell 125 may result in an incomplete handover procedure being performed at the UE 115, as shown in FIGS. 1A-1C. More particularly, as shown in FIG. 1A, in some cases the UE 115 may be moving within the macrocell 120 and/or the small cell 125, such as in examples in which the UE 115 is traveling along a road 130 (as indicated by the arrow 132 on the road 130 in FIG. 1A). As shown by reference number 135, when the UE 115 is at a first location on the road 130, the UE 115 may be within the coverage of the macrocell 120 and not within the coverage of the small cell 125. Accordingly, at the first location, the UE 115 may be served by the macrocell 120 (e.g., may have an established communication session with the first network device 105).

As shown in FIG. 1B, when the UE 115 is at a second location on the road 130, the UE 115 may be within a coverage of both the macrocell 120 and the small cell 125. In such aspects, the UE 115 may attempt to perform a handover procedure to the small cell 125. For example, the UE 115 measures a signal quality associated with the macrocell 120 and a signal quality associated with the small cell 125 (e.g., the UE 115 may determine one or more of a reference signal received power (RSRP) associated with each cell, a reference signal received quality (RSRQ) associated with each cell, a signal to interference plus noise ratio (SINR) associated with each cell, or a similar measurement associated with each cell). If a handover trigger condition (sometimes referred to as a measurement event) is met based on one or more measurements, the UE 115 may attempt to perform a handover to the small cell 125 (e.g., the UE 115 may attempt to establish a communication session with the second network device 110), as shown by reference number 140.

However, due to the relatively small coverage area provided by the small cell 125 and/or the movement of the UE 115, the UE 115 may move out of the coverage area of the small cell 125 prior to successful handover to the small cell 125. Additionally, even if the handover is successful, it may be unnecessary, as microcell 120 is capable of providing sufficient coverage to UE 115, resulting in an increase in unnecessary handovers and network traffic. More particularly, as shown in FIG. 1C, and as indicated by reference number 145, when the UE 115 is at a third position on the road 130, the UE 115 may once again be out of coverage of the small cell 125, yet still within coverage of the macrocell 120. Accordingly, because the UE 115 has left the coverage of the small cell 125, handover may fail. Thus, the UE 115 may re-attach to the macrocell 120, and thus reestablish and/or continue a communication session with the first network device 105.

In such examples, the initially determined transmit power level associated with the second network device 110 and/or the small cell 125 may have an adverse effect on the user experience at the UE 115. More particularly, the small cell 125 may be added as a result of cell densification to provide additional capacity and/or resolve indoor coverage issues. Currently, once deployed, small cells control their own transmit power based on the interference of the neighboring cells. In such examples, the small cell 125 may not be intended to cover certain areas (such as areas served by neighboring cells and/or a portion of the road 130 in the example shown in FIGS. 1A-1C), but the small cell 125 may nonetheless have inadvertently set its initial transmit power in such a way as to provide coverage to the unintended areas based on erroneous or transient initial power measurements, or the like. In the example shown in FIGS. 1A-1C, because the second network device 110 and/or the small cell 125 is associated with a high enough transmit power level such that the small cell 125 covers a portion of the road 130, UEs 115 traveling along the road may experience the incomplete handover procedure described above in connection with reference numbers 135-145. In contrast, if the transmit power level associated with the second network device 110 and/or the small cell 125 were reduced such that the small cell 125 coverage did not extend to the road 130, UEs 115 traveling along the road would not attempt a handover when near the small cell 125 but instead maintain a connection with the macrocell 120, and thus incomplete handover procedures associated with the second network device 110 and/or the small cell 125 may be reduced.

Figure 1D:
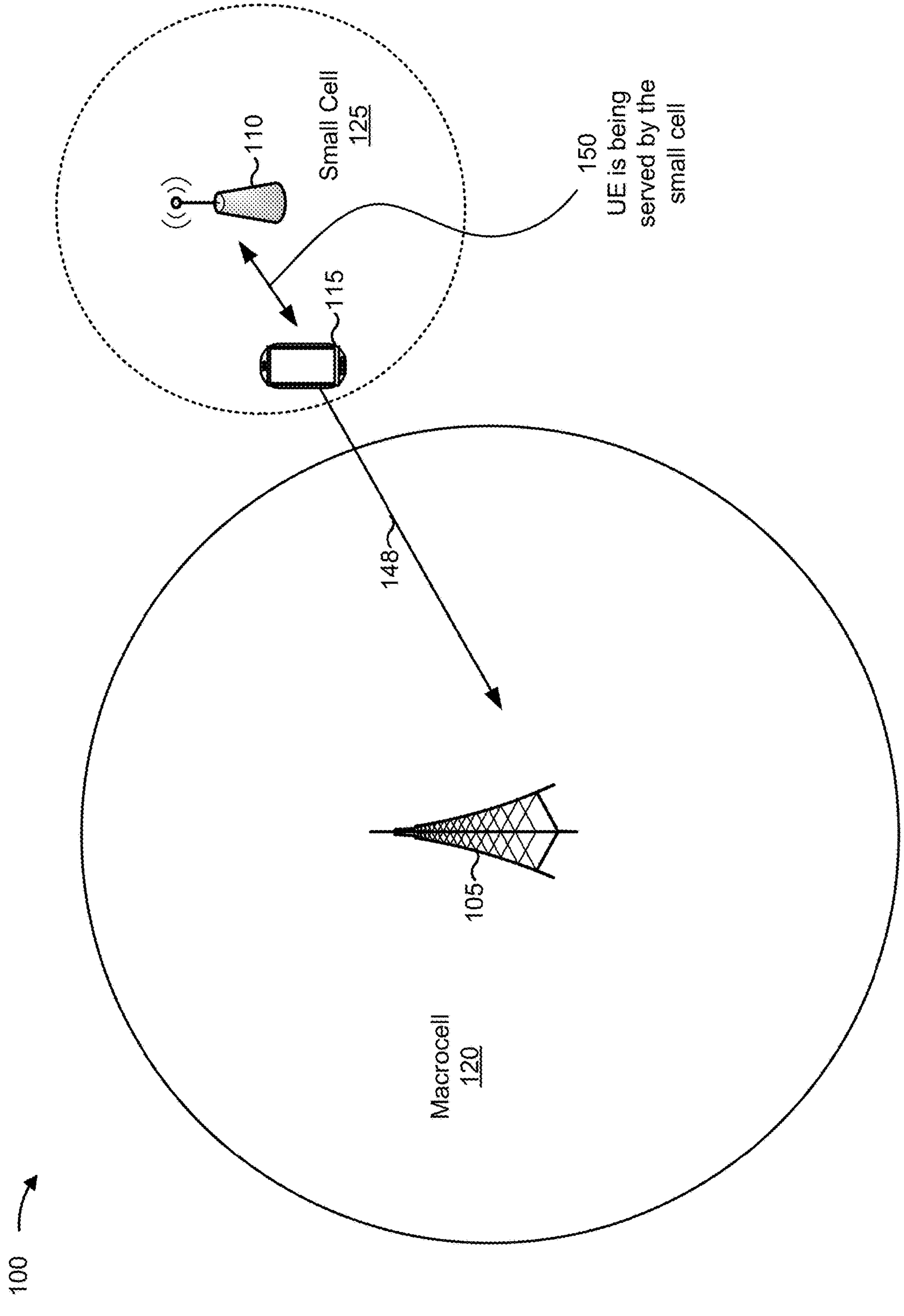

In some other examples, a relatively low initially determined transmit power level associated with the second network device 110 and/or the small cell 125 may result in a poor end user experience. More particularly, as shown in FIG. 1D, in some examples coverage provided by the macrocell 120 and the small cell 125 may not overlap (e.g., a coverage gap may be provided between the small cell 125 and the macrocell 120) resulting in degraded network performance. In such examples, a UE 115 may experience a dropped call, radio link failure, or a similar network disruption when the UE 115 travels from coverage provided by one of the small cell 125 or the macrocell 120 to coverage provided by the other of the small cell 125 or the macrocell 120.

Figure 1E:
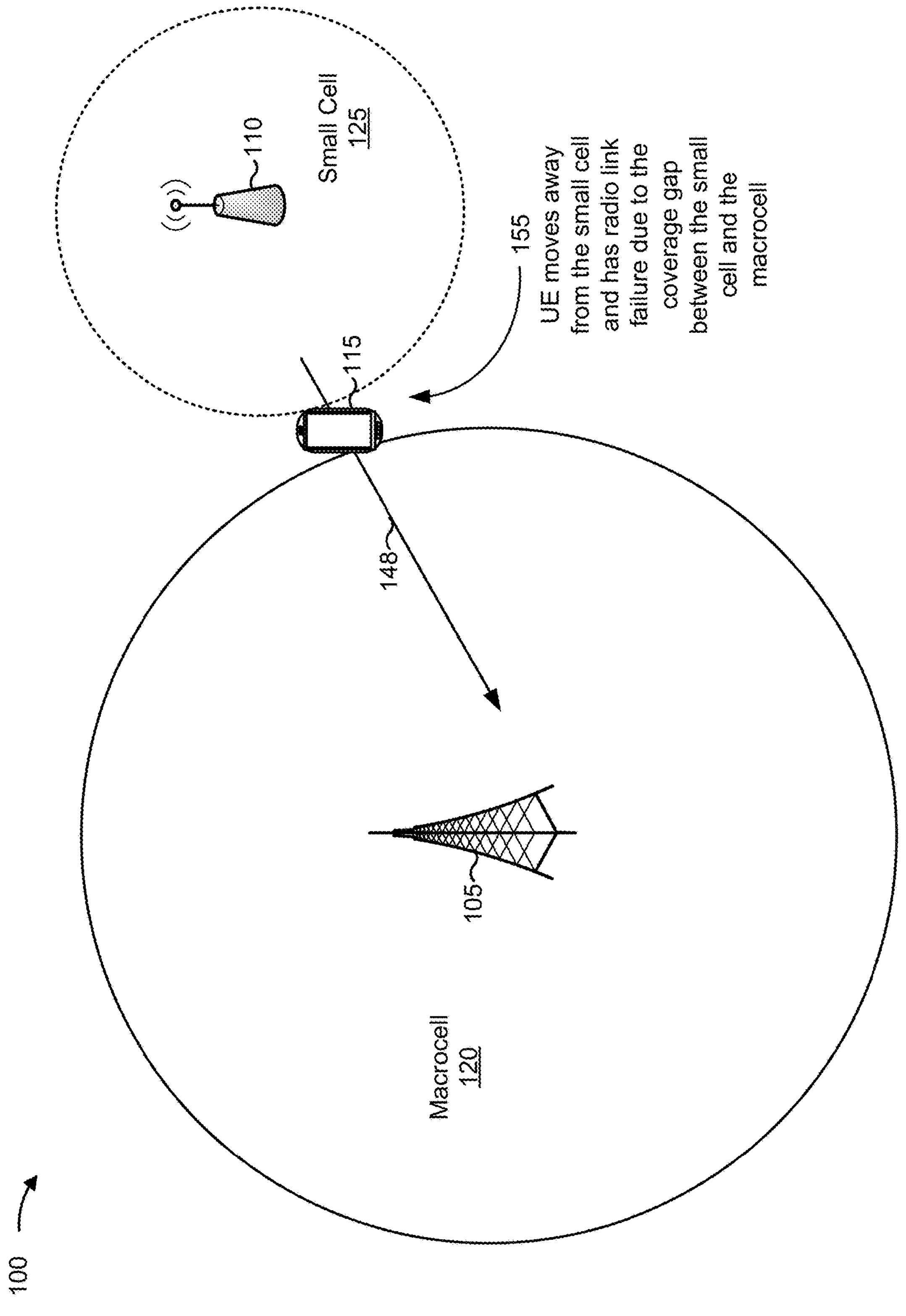

More particularly, as shown by the arrow 148 in FIG. 1D, in some examples the UE 115 may move from coverage provided by the small cell 125 to coverage provided by the macrocell 120. In such examples, as indicated by reference number 150, the UE 115 may initially be served by the small cell 125 (e.g., the UE 115 may have an established communication session with the second network device 110). However, as shown in FIG. 1E, and as indicated by reference number 155, as the UE 115 moves away from the small cell 125, the UE 115 may move into a coverage gap between the small cell 125 and the macrocell 120. In such examples, the UE 115 may experience radio link failure or other network disruption while in the coverage gap.

In such examples, a relatively low initially determined transmit power level associated with the second network device 110 and/or the small cell 125 may have an adverse effect on the user experience at the UE 115. More particularly, because the second network device 110 and/or the small cell 125 is associated with a low transmit power level such that the small cell 125 coverage does not extend to the coverage provided by the macrocell 120, UEs 115 traveling away from the small cell 125 may experience disrupted service (e.g., radio link failure), as described above in connection with reference numbers 150-155. In contrast, if the transmit power level associated with the second network device 110 and/or the small cell 125 were increased in such examples such that the small cell 125 coverage extended to the macrocell 120 and/or overlapped with coverage provided by the macrocell 120, the coverage gap between the small cell 125 and the macrocell 120 may be eliminated, and thus UEs 115 traveling away from the small cell 125 may experience reduced radio link failure instances and otherwise improved network coverage.

In some implementations, a network device associated with a small cell (e.g., the second network device 110) may adjust a transmit power level, such as for purposes of reducing incomplete handover procedures, reducing radio link failure occurrences, and/or reducing other network disruptions. More particularly, in some implementations the second network device 110 may monitor KPIs associated with the small cell 125 and, based on the KPIs, may self-optimize the cell coverage (e.g., by increasing or decreasing a power transmit level), thereby reducing incomplete handover procedures and/or radio link failure occurrences, reducing communication errors associated with UEs 115 (and thus reducing power, computing, and network resource consumption associated with correcting communication errors), and otherwise improving an end user experience. Aspects of a network device monitoring KPIs associated with a cell and/or self-optimizing a cell coverage based on the KPIs are described in more detail below in connection with FIGS. 2A-2G.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

FIGS. 2A-2H are diagrams of an example 200 associated with cell power optimization using KPIs. As shown in FIGS. 2A-2H, example 200 includes the first network device 105, the second network device 110, and the UE 115.

Figure 2A:
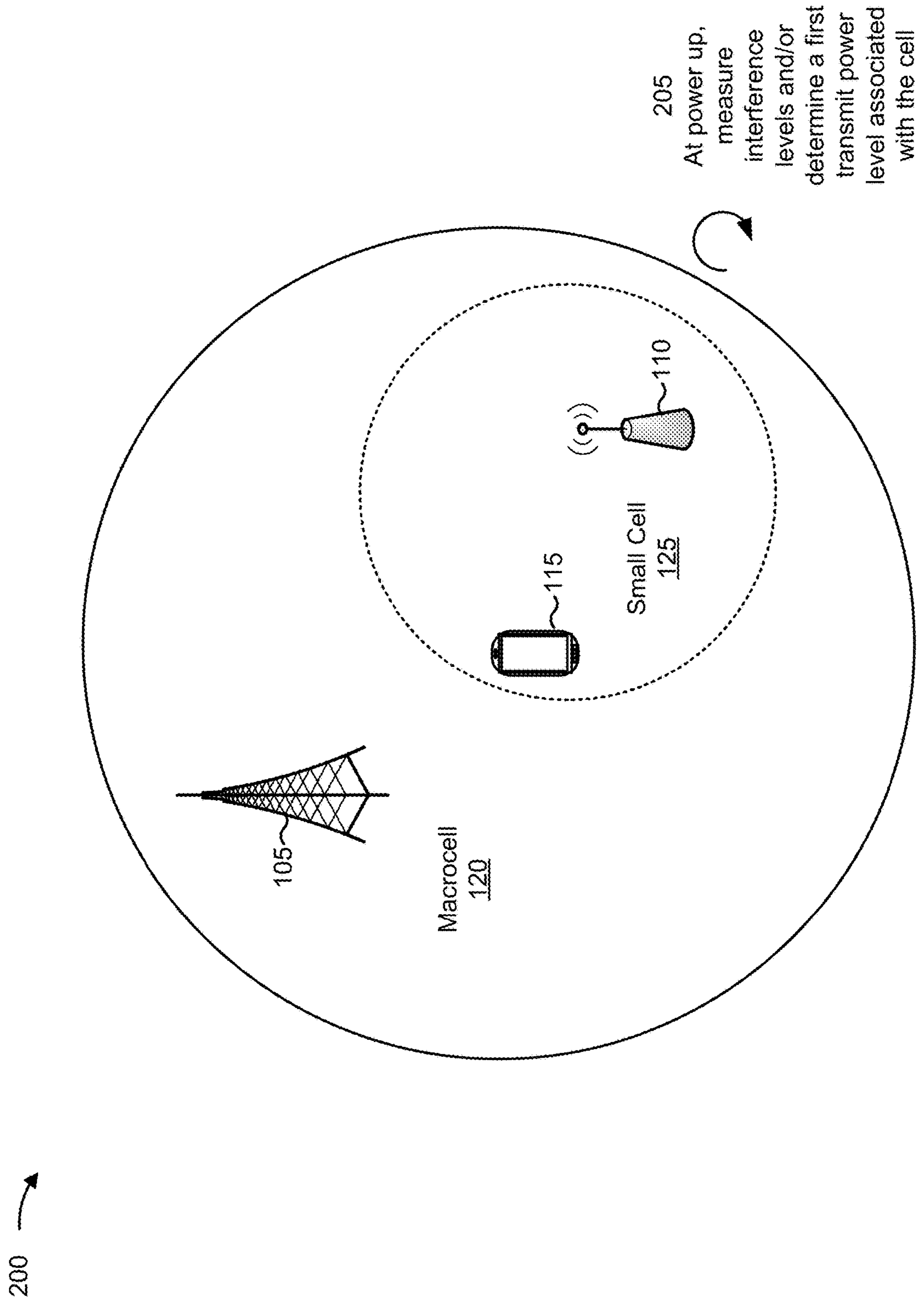
FIGS. 2A-2H are diagrams of an example associated with cell power optimization using key performance indicators (KPIs).

As shown in FIG. 2A, and as indicated by reference number 205, after performing an initial radio frequency (RF) scan, and/or as part of a network device power up procedure, the second network device 110 (e.g., a network device associated with the small cell 125) may determine a first transmit power level associated with the cell (e.g., an initial transmit power to be used by the second network device 110). As described above in connection with FIGS. 1A-1E, the first transmit power level may determine an initial coverage area associated with the small cell 125. In some implementations, the second network device 110 may determine the first transmit power level based on neighboring cells' interference levels (e.g., based on interference from the macrocell 120 and/or any other neighboring cells). In such implementations, upon powering up or during a similar setup phase, the second network device 110 may measure interference associated with one or more other cells, and thus determine the first transmit power level associated with the small cell 125 based on the interference associated with the one or more other cells.

Figure 2B:
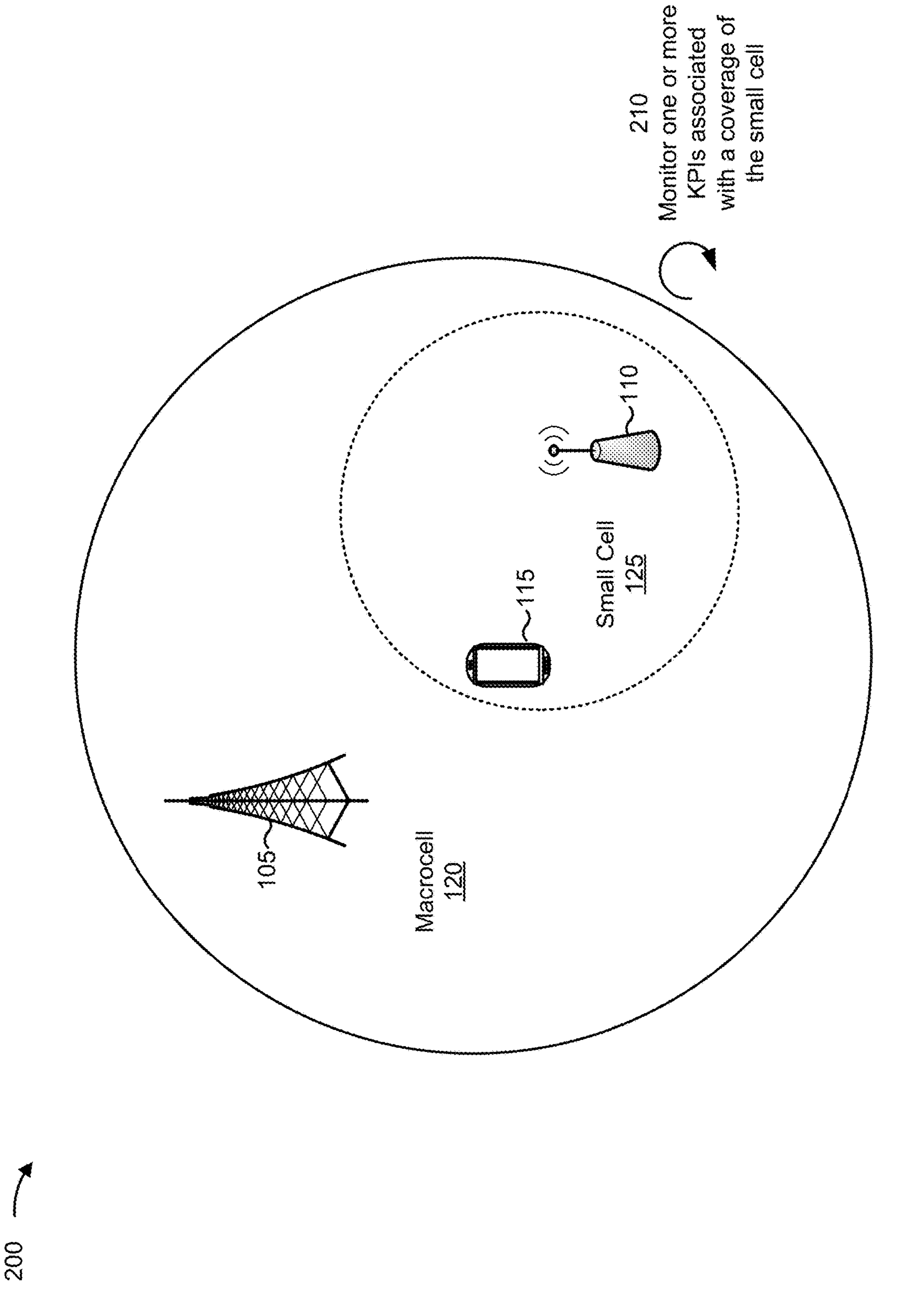

Once in service, the second network device 110 may monitor KPIs or similar performance statistics, and thus optimize a transmit power level associated with the small cell 125 based on the KPIs, interference levels, and similar parameters. More particularly, as shown by FIG. 2B, and as indicated by reference number 210, in some implementations the second network device 110 monitor one or more KPIs associated with a coverage of the small cell 125. In some implementations, the one or more KPIs may include an incomplete handover procedures KPI, which may be a performance statistic tracking a number of attempted handover procedures that resulted in handover failure (such as the attempted handover procedure described above in connection with FIGS. 1A-1C). Additionally, or alternatively, in some implementations, the one or more KPIs may include an active connection drop KPI, which may be a performance statistic tracking a number of radio link failures that occurred without a graceful connection release (such as the radio link failure described above in connection with FIGS. 1D-1E). In some other implementations, the second network device 110 may monitor additional KPIs and/or performance statistics associated with a service and/or coverage provided by the small cell 125.

Figure 2C:
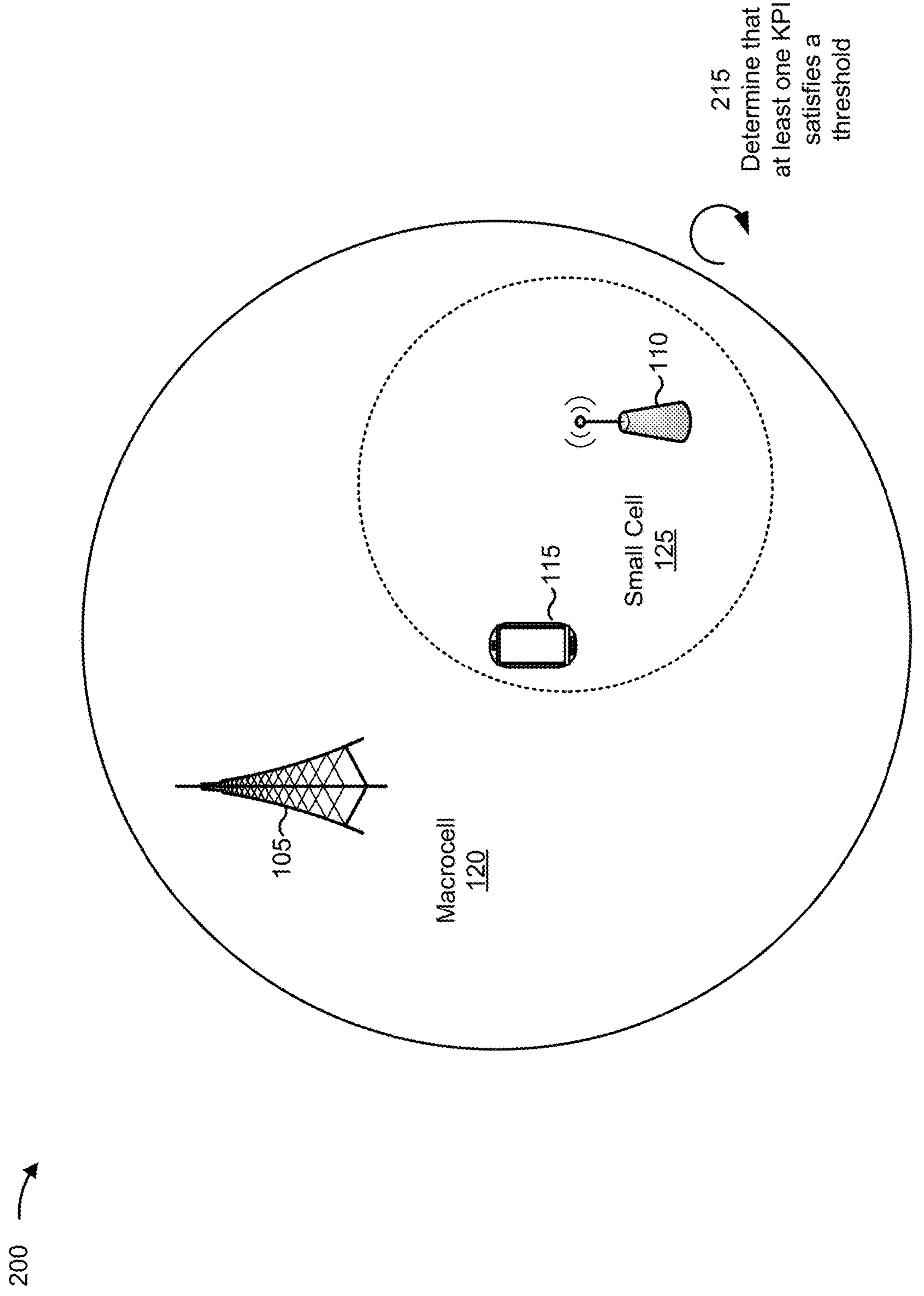

As shown by FIG. 2C, and as indicated by reference number 215, in some implementations the second network device 110 may determine that at least one KPI, of the one or more KPIs, satisfies a threshold. More particularly, the second network device 110 may be associated with a KPI monitoring algorithm that utilizes the KPIs to determine and correct the RF cell coverage radius by adjusting the transmit power level on a periodic basis. In such implementations, the KPI monitoring algorithm may be associated with the second network device 110 monitoring one or more KPIs associated with a coverage of the cell and determining whether the one or more KPIs satisfy a threshold. In implementations in which the second network device 110 monitors the incomplete handover procedures KPI, the second network device 110 may determine whether the incomplete handover procedures KPI satisfies a first threshold. Additionally, or alternatively, in implementations in which the second network device 110 monitors the active connection drop KPI, the second network device 110 may determine whether the active connection drop KPI satisfies a second threshold. Aspects of a KPI monitoring algorithm that may be employed by the second network device 110 are described in more detail below in connection with FIGS. 2G and 2H.

Figure 2D:
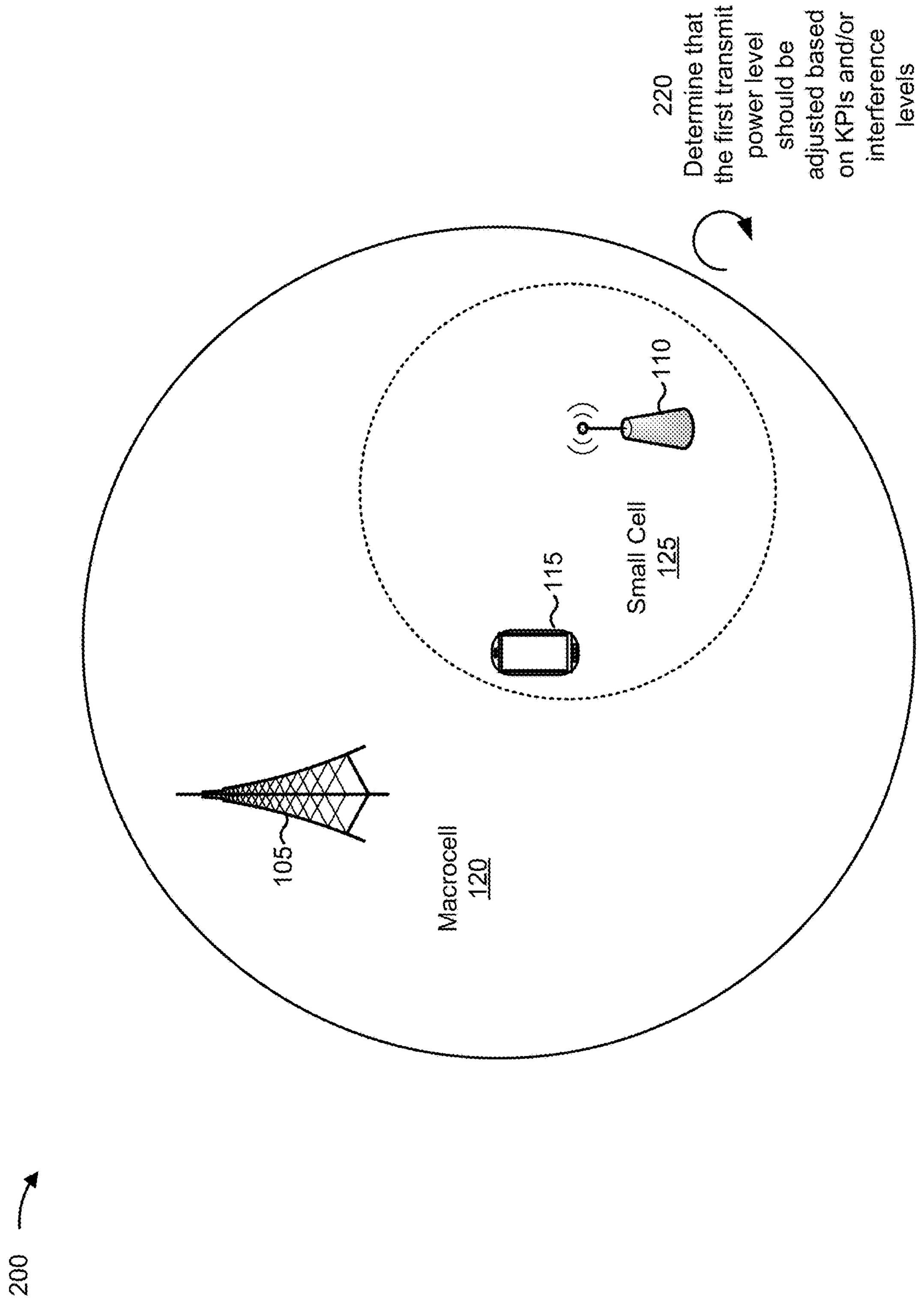

As shown by FIG. 2D, and as indicated by reference number 220, in some implementations the second network device 110 may determine, based on the at least one KPI satisfying the threshold, measured interference levels, and/or similar information, that the first transmit power level should be adjusted. For example, if the incomplete handover procedures KPI satisfies a first threshold, this may be indicative that a transmit power level associated with the second network device 110 should be decreased (e.g., such that the coverage provided by the small cell 125 does not reach the road 130 in the example described above in connection with FIGS. 1A-1C). Additionally, or alternatively, if the active connection drop KPI satisfies a second threshold, this may be indicative that a transmit power level associated with the second network device 110 should be increased (e.g., such that there is not a coverage gap between the coverage provided by the small cell 125 and the macrocell 120 in the example described above in connection with FIGS. 1D-1E). In implementations in which multiple KPIs satisfy a corresponding threshold, the KPI monitoring algorithm may weight each KPI in determining whether a transmit power level adjustment is needed, as described in more detail below in connection with FIG. 2H. Additionally, or alternatively, the second network device 110 may be configured to periodically reevaluate its transmit power level, such as by determining whether a transmit power level associated with the small cell 125 is to be adjusted on a periodic basis (e.g., once every configured period of time, or the like).

Figure 2E:
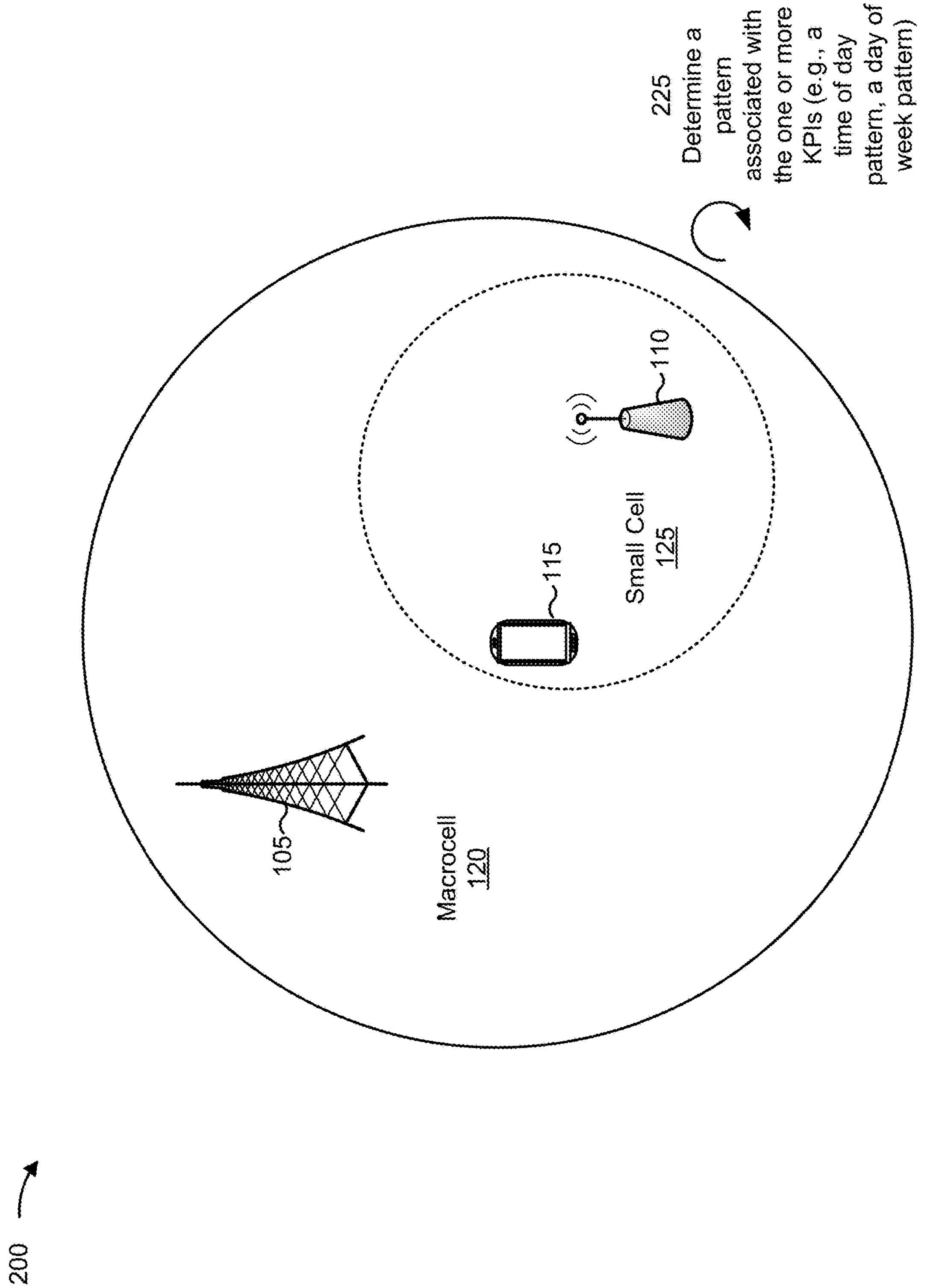

As shown in FIG. 2E, and as indicated by reference number 225, in some implementations the second network device 110 may determine a pattern associated with the one or more KPIs satisfying a corresponding threshold. For example, the second network device 110 may determine a pattern associated with at least one of a time of day associated with the at least one KPI satisfying the threshold, a day of the week associated with the at least one KPI satisfying the threshold, or a similar pattern. In that regard, the second network device 110 may be configured to proactively adjust a transmit power level according to a determined pattern. For example, if the pattern indicates that the incomplete handover procedures KPI spikes on weekdays during a rush hour or similar time of day, the second network device 110 may reduce a transmit power level during weekdays and/or during the rush hour in order to decrease a number of handover procedures that result in failure. If the pattern indicates that the active connection drop KPI spikes on weekends, the second network device 110 may be configured to increase a transmit power level on the weekends in order to decrease coverage gaps experienced then.

Figure 2F:
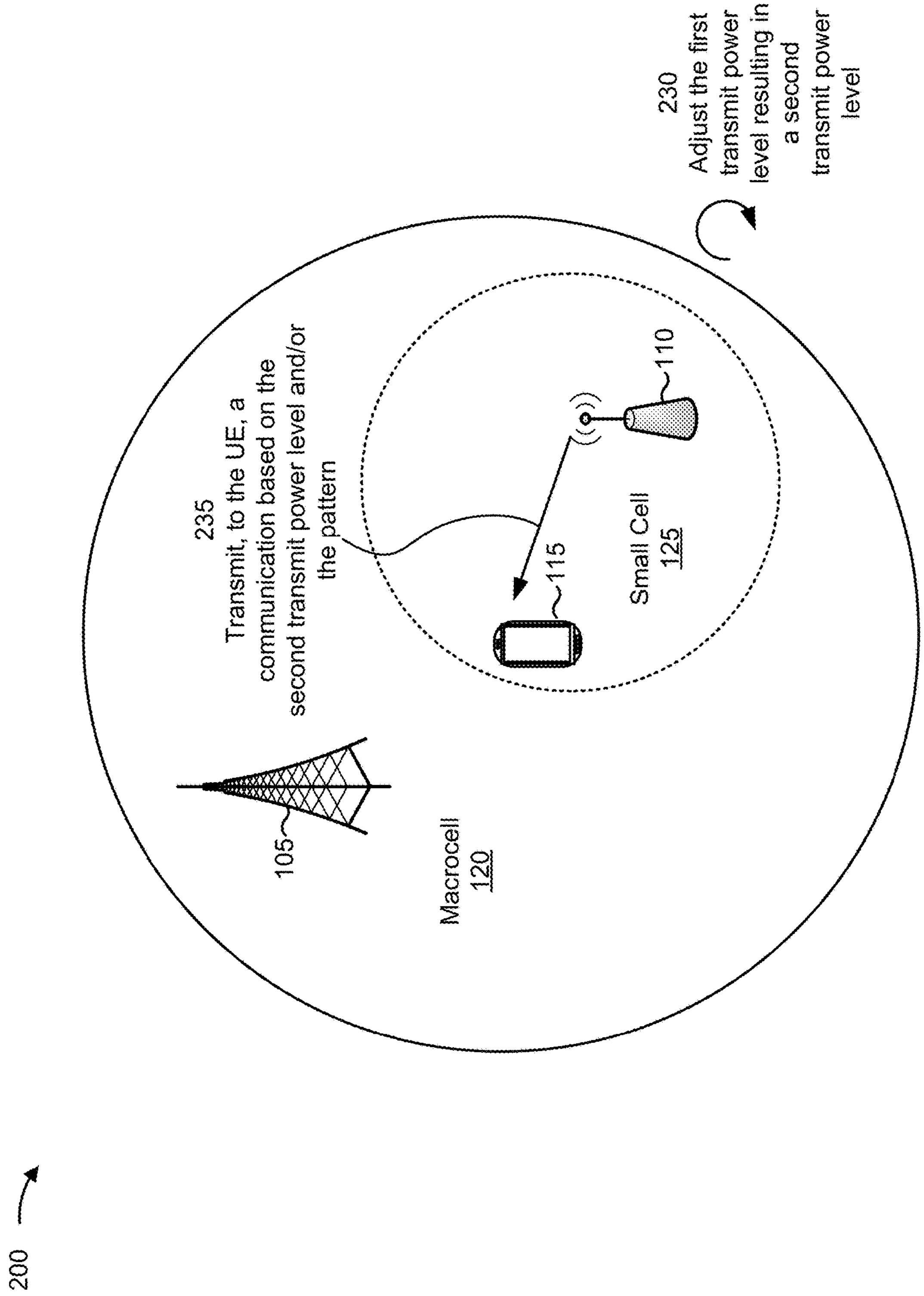

As shown by FIG. 2F, and as indicated by reference number 230, in some implementations the second network node may adjust the first transmit power level, resulting in a second transmit power level associated with the cell. In some implementations, the second transmit power level may be lower than the first transmit power level. In some other implementations, the second transmit power level may be higher than the first transmit power level. Moreover, as described above in connection with reference number 225, in some implementations, adjusting the first transmit power level includes adjusting the first transmit power level based on a determined pattern. Additionally, or alternatively, in implementations in which the second network device 110 monitors more than one KPI, adjusting the first transmit power to the second transmit power level may include determining a positive or negative power increment for adjusting the first power level according to a weighted function associated with the multiple KPIs. Put another way, in implementations in which the one or more KPIs includes a first KPI and a second KPI, the second network device 110 may adjust the first transmit power level as a function of at least a first factor and a second factor, with the first factor being a first product of a first weight and the first KPI, and with the second factor being a second product of a second weight and the second KPI. Aspects of determining a positive or negative power increment for adjusting the first power level according to a weighted function associated with multiple KPIs are described in more detail below in connection with FIG. 2H.

As further shown by FIG. 2F, and as indicated by reference number 235, in some aspects the second network device 110 may communicate using the adjusted transmit power level (e.g., using the second transmit power level). For example, the second network device 110 may transmit a communication to the UE 115 using the second transmit power level (e.g., using the adjusted transmit power level). In this way, the UE 115 may experience reduced incomplete handovers, reduced radio link failures or similar network disruptions, and/or other service improvements based on the second network device 110 optimizing its transmit power level based on the one or more KPIs.

Figure 2G:
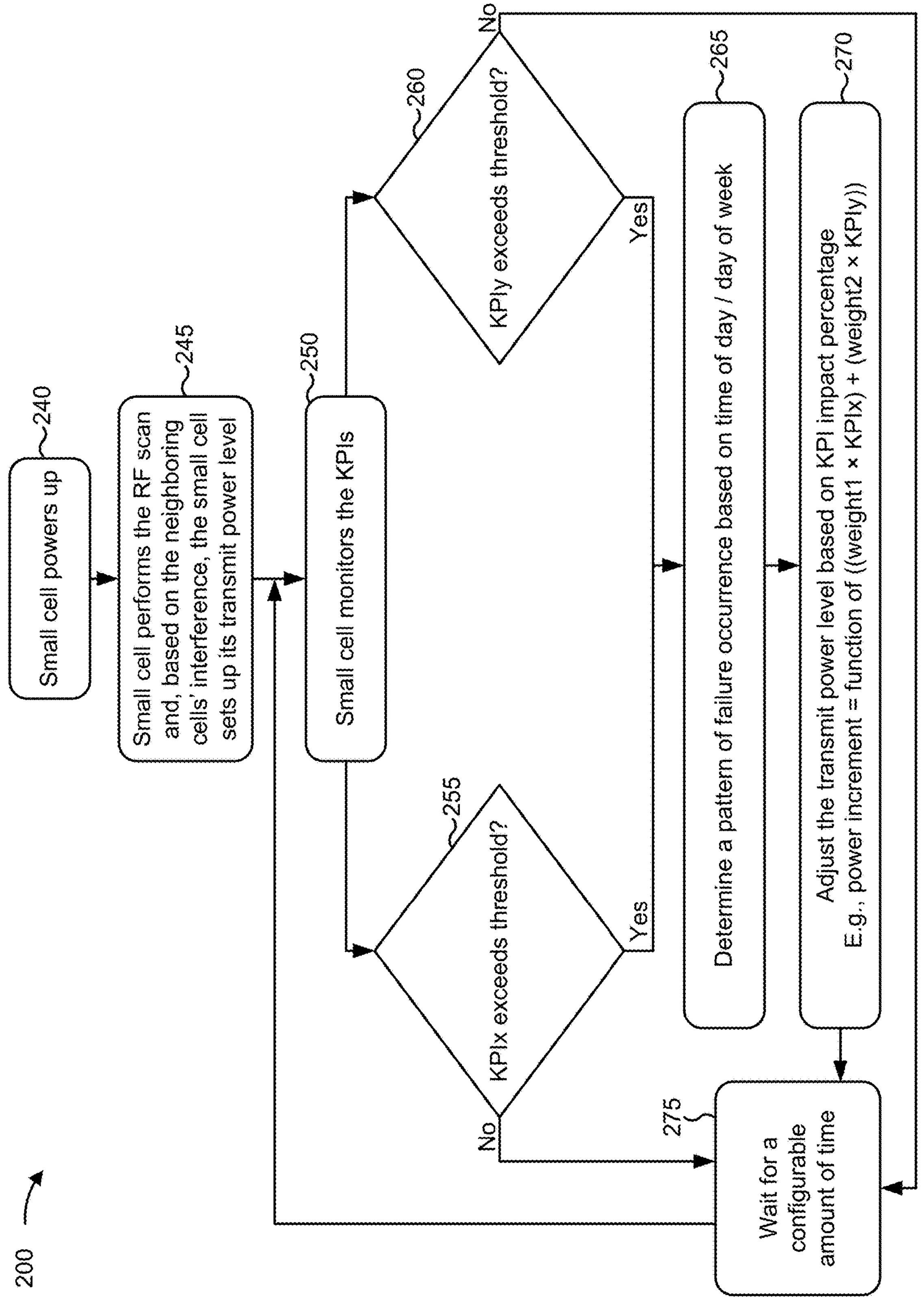

FIG. 2G depicts a schematic summarizing a KPI monitoring algorithm that may be employed by the second network device 110 to monitor certain performance statistics to determine and correct the RF cell coverage radius by adjusting the transmit power level on a periodic basis, such as the operations described above in connection with FIGS. 2A-2F. As shown by reference number 240, a network device associated with a small cell (referred to simply as a "small cell" in connection with FIG. 2G for ease of description) powers up. As shown by reference number 245, upon powering up, the small cell may perform an initial RF scan (e.g., scan certain RF channels and/or frequency bands for interference or the like) and, based on neighboring cells' interference, the small cell may set up an initial transmit power level (e.g., in a similar manner as described above in connection with reference number 205 in FIG. 2A).

As shown by reference number 250, after setting up an initial transmit power level, the small cell may begin to monitor one or more KPIs (e.g., in a similar manner as described above in connection with reference number 210 in FIG. 2B). In some implementations, the small cell may monitor one or more KPIs by receiving one or more indications of the one or more KPIs from a network device configured to measure and/or determine the one or more KPIs. In some other implementations, the small cell may be configured to measure and/or determine the one or more KPIs itself, and thus the small cell may monitor the one or more KPIs by measuring and/or determining the one or more KPIs at the small cell. For example, the small cell may monitor a first KPI (shown as "KPIx" in FIG. 2G), and/or the small cell may monitor a second KPI (shown as "KPIy" in FIG. 2G). In some implementations, the first KPI (e.g., KPIx) and/or the second KPI (e.g., KPIy) may correspond to an incomplete handover procedures KPI, an active connection drop KPI, or a similar KPI. In some other implementations, more or less KPIs may be monitored without departing from the scope of the disclosure. Moreover, as shown by reference numbers 255 and 260, the small cell may determine whether one or more KPIs exceeds a threshold. More particularly, as shown in connection with reference number 255, the small cell may determine whether the first KPI (e.g., KPIx) exceeds a first threshold, and, as shown in connection with reference number 260, the small cell may determine whether a second KPI (e.g., KPIy) exceeds a second threshold (e.g., in a similar manner as described above in connection with reference number 215 in FIG. 2C). If one or more KPIs exceeds a threshold (shown by the arrows labeled "Yes" at the operations indicated by reference numbers 255 and 260), the small cell may adjust a transmit power level in order to improve a quality of experience for an end user.

More particularly, as shown by reference number 265, in some implementations the small cell may determine a pattern of failure occurrence associated with the one or more KPIs. For example, the small cell may determine a time of day that one or more KPIs typically exceed a threshold, a day of the week that one or more KPIs typically exceed a threshold, or a similar pattern (e.g., in a similar manner as described above in connection with reference number 225 in FIG. 2E). Additionally, or alternatively, as shown by reference number 270, the small cell may adjust a transmit power level based on the one or more KPIs exceeding a threshold and/or based on the determined pattern (e.g., in a similar manner as described above in connection with reference number 230 in FIG. 2F). For example, the small cell may adjust the transmit power level based on a KPI impact percentage, such as by determining a positive or negative power increment based on a function of the first KPI (e.g., KPIx) multiplied by a first weight (shown as "weight1" in FIG. 2G) and the second KPI (e.g., KPIy) multiplied by a second weight (shown as "weight2" in FIG. 2G). Additionally, or alternatively, the small cell may adjust (up or down) the transmit power level based on a day of the week, a time of the day, or a similarly determined transmit power level pattern.

In some implementations, the small cell may be configured to periodically reevaluate the transmit power level and/or periodically readjust the transmit power level, if needed. In that regard, as shown by reference number 275, after adjusting the transmit power level, the small cell may wait a configurable amount of time. Once the configurable amount of time has elapsed (e.g., corresponding to a periodicity at which the small cell is configured to periodically reevaluate the transmit power level and/or readjust the transmit power level, if needed), the small cell may repeat the operations described above in connection with reference numbers 250-270. Additionally, or alternatively, in instances in which the small cell determines that a transmit power level adjustment is not needed, such as when no monitored KPIs exceeds a threshold (shown by the arrows labeled "No" at the operations indicated by reference numbers 255 and 260), the small cell may maintain a current transmit power and simply wait the configurable amount of time to reevaluate the transmit power level.

Figure 2H:
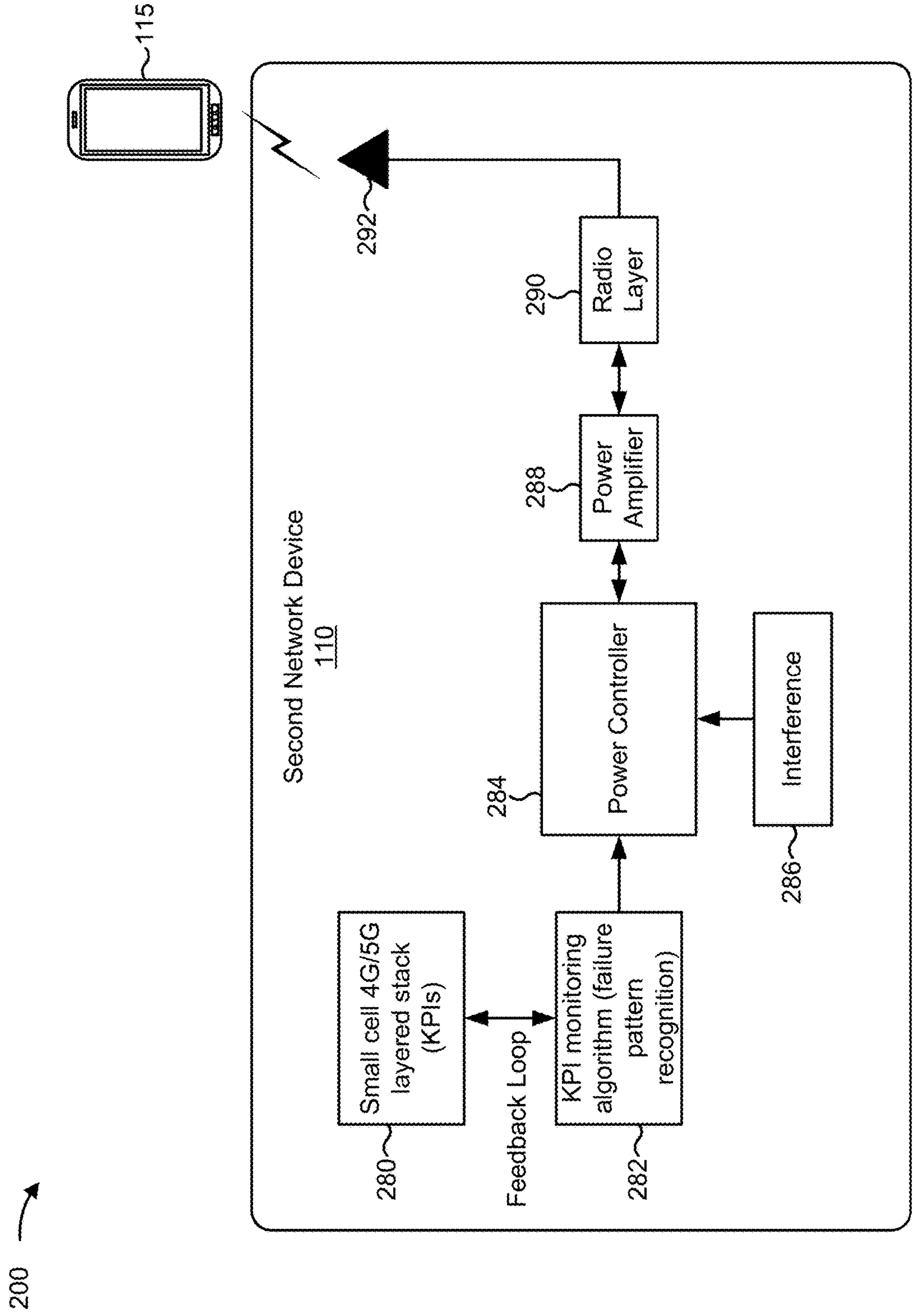

FIG. 2H depicts example components of the second network device 110 that may be associated with implementing a KPI monitoring algorithm (such as the KPI monitoring algorithm described above in connection with FIG. 2G). In some implementations, the second network device 110 may be associated with a small cell 4G/5G layered stack 280, which may be a component of the second network device 110 configured to monitor one or more KPIs (such as one or more of the KPIs described above in connection with FIGS. 2A-2G or other KPIs). The small cell 4G/5G layered stack 280 may be in a feedback loop with a component associated with a KPI monitoring algorithm 282 (e.g., the KPI monitoring algorithm described above in connection with FIG. 2G).

Moreover, the second network device 110 may be associated with a power controller 284, which may be a component configured to adjust a transmit power level associated with the second network device 110. In some implementations, the power controller 284 may be configured to set and/or adjust a transmit power level according to one or more inputs, such as inputs from the KPI monitoring algorithm 282 and/or inputs from an interference component 286 that is configured to measure RF interference from neighboring cells, or the like.

In that regard, based on the one or more KPIs and/or interference levels, the power controller 284 may increase or decrease a transmit power level associated with the second network device 110 in order to improve an end user experience (e.g., in order to reduce a number of incomplete handovers associated with UEs 115, in order to decrease a number of radio link failure instances associated with UEs 115, and/or in order to improve other equality of experience metrics). For example, the power controller 284 may be communicatively coupled to a power amplifier 288, a radio layer component 290, and/or antenna array 292, and, using an optimal transmit power level determined based on the KPI monitoring algorithm 282 and/or interference measurements from the interference component 286, the power controller 284 may control the power amplifier 288, the radio layer component 290, and/or antenna array 292 to communicate with one or more UEs 115 using an optimal transmit power level.

Based on a network device adjusting a transmit power level based on KPIs or similar performance metrics, the network device and/or a UE in communication with the network device may conserve computing, power, network, and/or communication resources that may have otherwise been consumed by the network device using a static transmit power level. For example, based on the network device adjusting a transmit power level based on KPIs or similar performance metrics, the network device and the UE may communicate with a reduced error rate, which may conserve computing, power, network, and/or communication resources that may have otherwise been consumed to detect and/or correct communication errors.

As indicated above, FIGS. 2A-2H are provided as an example. Other examples may differ from what is described with regard to FIGS. 2A-2H. The number and arrangement of devices shown in FIGS. 2A-2H are provided as an example. In practice, there may be additional devices, fewer devices, different devices, or differently arranged devices than those shown in FIGS. 2A-2H. Furthermore, two or more devices shown in FIGS. 2A-2H may be implemented within a single device, or a single device shown in FIGS. 2A-2H may be implemented as multiple, distributed devices. Additionally, or alternatively, a set of devices (e.g., one or more devices) shown in FIGS. 2A-2H may perform one or more functions described as being performed by another set of devices shown in FIGS. 2A-2H.

Figure 3:
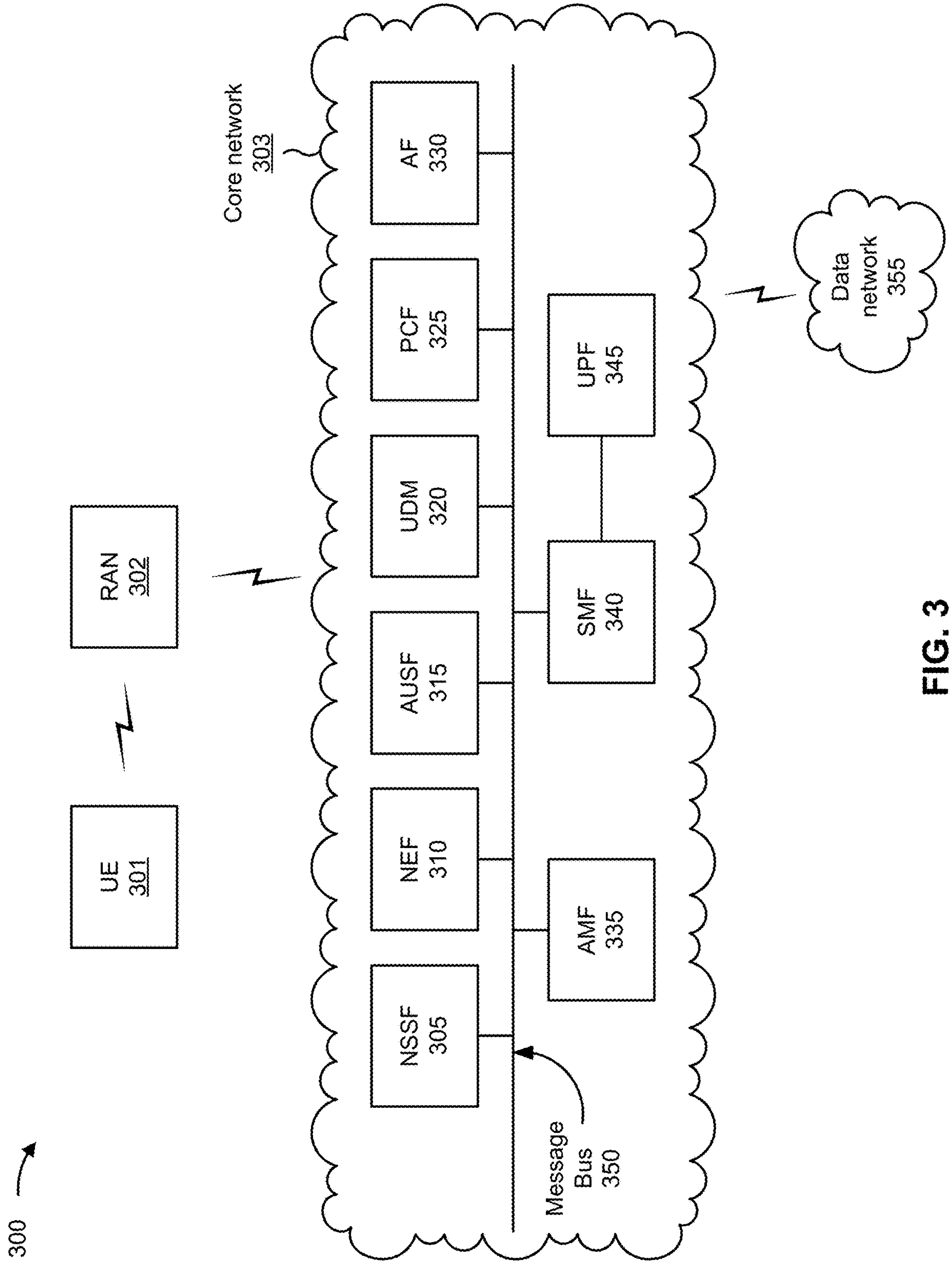
FIG. 3 is a diagram of an example environment in which systems and/or methods described herein may be implemented.

FIG. 3 is a diagram of an example environment 300 in which systems and/or methods described herein may be implemented. As shown in FIG. 3, the example environment 300 may include a UE 301 (e.g., UE 115), a RAN 302 (e.g., network device 105, 110), a core network 303, and a data network 355. The devices and/or networks of the example environment 300 may interconnect via wired connections, wireless connections, or a combination of wired and wireless connections.

The UE 301 includes one or more devices capable of receiving, generating, storing, processing, and/or providing information, such as information described herein. For example, the UE 301 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 302 may support, for example, a cellular radio access technology (RAT). The RAN 302 may include one or more base stations (e.g., base transceiver stations, radio base stations, node Bs, eNBs, gNBs, base station subsystems, cellular sites, cellular towers, access points, transmit receive points (TRPs), radio access nodes, macrocell base stations, microcell base stations, picocell base stations, femtocell base stations, RUs, DUs, CUs, or similar types of devices) and other network entities that can support wireless communication for the UE 301. The RAN 302 may transfer traffic between the UE 301 (e.g., using a cellular RAT), one or more base stations (e.g., using a wireless interface or a backhaul interface, such as a wired backhaul interface), and/or the core network 303. The RAN 302 may provide one or more cells that cover geographic areas.

In some implementations, the RAN 302 may perform scheduling and/or resource management for the UE 301 covered by the RAN 302 (e.g., the UE 301 covered by a cell (e.g., macrocell 120, small cell 125) provided by the RAN 302). In some implementations, the RAN 302 may be controlled or coordinated by a network controller, which may perform load balancing, network-level configuration, and/or other operations. The network controller may communicate with the RAN 302 via a wireless or wireline backhaul. In some implementations, the RAN 302 may include a network controller, a self-organizing network (SON) module or component, or a similar module or component. In other words, the RAN 302 may perform network control, scheduling, and/or network management functions (e.g., for uplink, downlink, and/or sidelink communications of the UE 301 covered by the RAN 302).

In some implementations, the core network 303 may include an example functional architecture in which systems and/or methods described herein may be implemented. For example, the core network 303 may include an example architecture of a 5G next generation (NG) core network included in a 5G wireless telecommunications system. While the example architecture of the core network 303 shown in FIG. 3 may be an example of a service-based architecture, in some implementations, the core network 303 may be implemented as a reference-point architecture and/or a 4G core network, among other examples.

As shown in FIG. 3, the core network 303 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 305 includes one or more devices that select network slice instances for the UE 301. By providing network slicing, the NSSF 305 allows an operator to deploy multiple substantially independent end-to-end networks potentially with the same infrastructure. In some implementations, each slice may be customized for different services.

The NEF 310 includes one or more devices that support exposure of capabilities and/or events in the wireless telecommunications system to help other entities in the wireless telecommunications system discover network services.

The AUSF 315 includes one or more devices that act as an authentication server and support the process of authenticating the UE 301 in the wireless telecommunications system.

The UDM 320 includes one or more devices that store user data and profiles in the wireless telecommunications system. The UDM 320 may be used for fixed access and/or mobile access in the core network 303.

The PCF 325 includes one or more devices that provide a policy framework that incorporates network slicing, roaming, packet processing, and/or mobility management, among other examples.

The AF 330 includes one or more devices that support application influence on traffic routing, access to the NEF 310, and/or policy control, among other examples.

The AMF 335 includes one or more devices that act as a termination point for non-access stratum (NAS) signaling and/or mobility management, among other examples.

The SMF 340 includes one or more devices that support the establishment, modification, and release of communication sessions in the wireless telecommunications system. For example, the SMF 340 may configure traffic steering policies at the UPF 345 and/or may enforce user equipment Internet protocol (IP) address allocation and policies, among other examples.

The UPF 345 includes one or more devices that serve as an anchor point for intraRAT and/or interRAT mobility. The UPF 345 may apply rules to packets, such as rules pertaining to packet routing, traffic reporting, and/or handling user plane quality of service (QoS), among other examples.

A message bus 350 represents a communication structure for communication among the functional elements. In other words, the message bus 350 may permit communication between two or more functional elements.

The data network 355 includes one or more wired and/or wireless data networks. For example, the data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
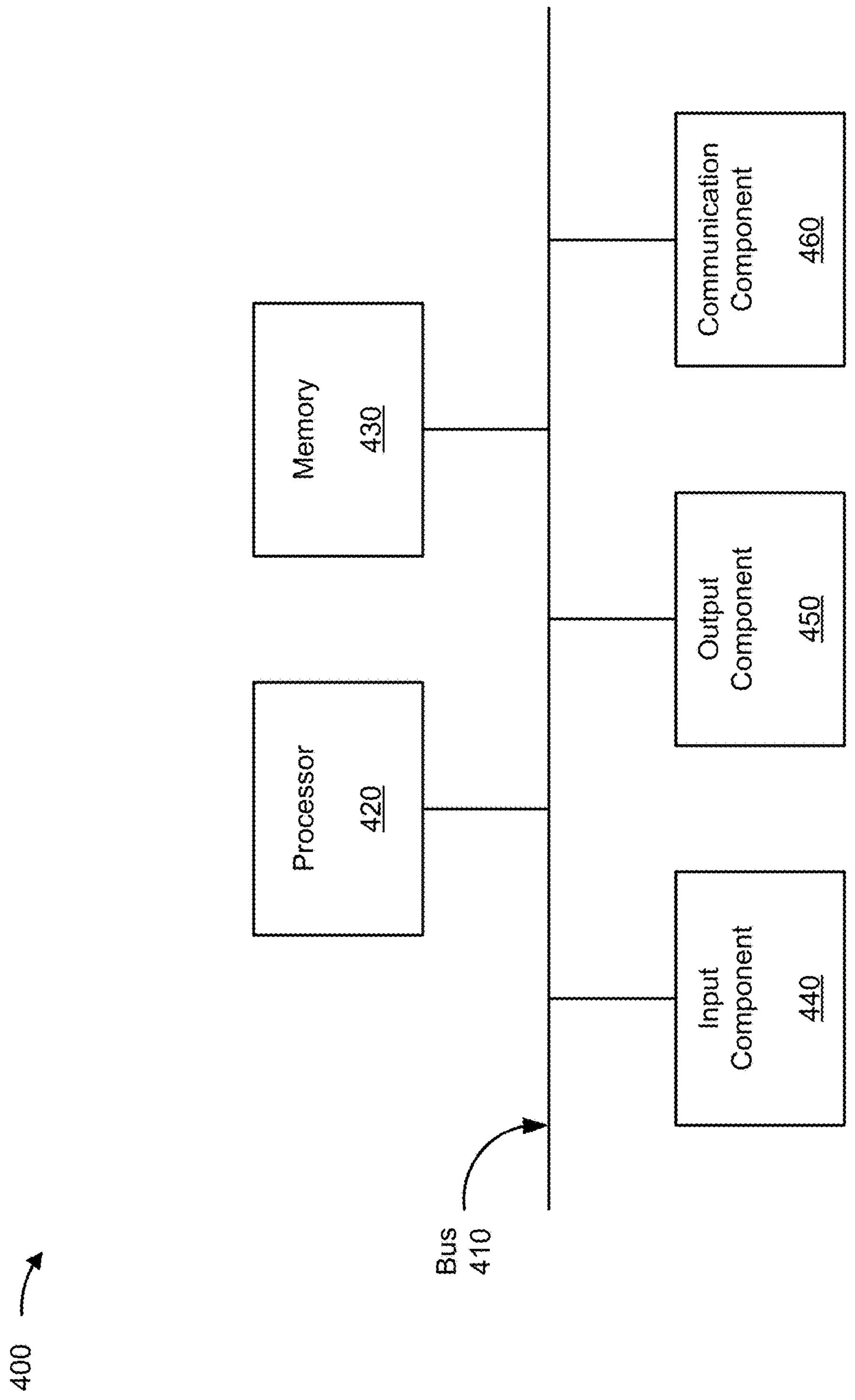
FIG. 4 is a diagram of example components of a device associated with cell power optimization using KPIs.

FIG. 4 is a diagram of example components of a device 400 associated with cell power optimization using KPIs. The device 400 may correspond to the first network device 105, the second network device 110, and/or the RAN 302. In some implementations, the first network device 105, the second network device 110, and/or the RAN 302 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein. In some implementations, the processor 420 may correspond to, and/or may be associated with, the power controller 284 described above in connection with FIG. 2H.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna. In some implementations, the communication component 460 may correspond to, and/or may be associated with, the power controller 284, the power amplifier 288, the radio layer component 290, and/or the antenna array 292 described above in connection with FIG. 2H.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
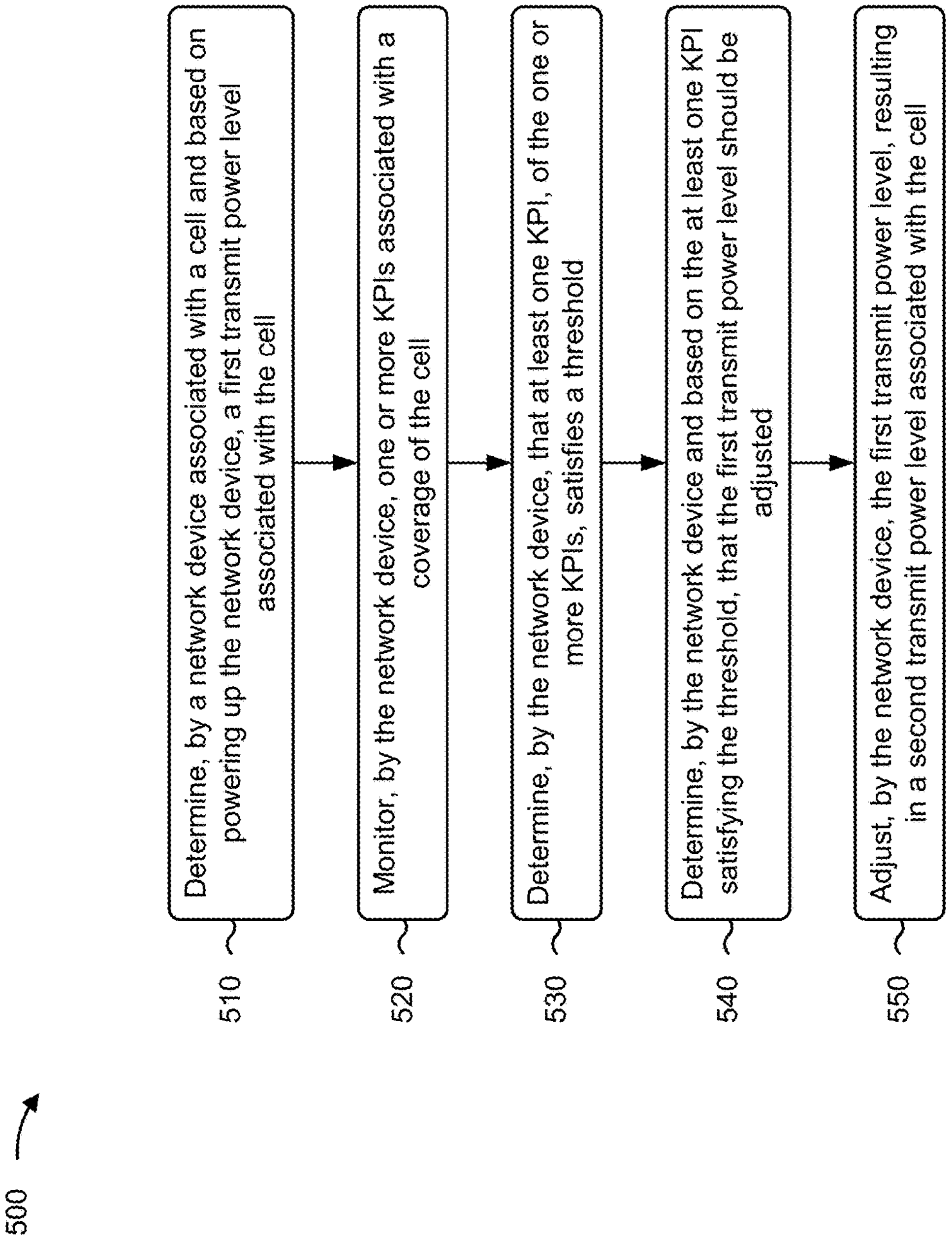
FIG. 5 is a flowchart of an example process associated with cell power optimization using KPIs.

FIG. 5 is a flowchart of an example process 500 associated with cell power optimization using KPIs. In some implementations, one or more process blocks of FIG. 5 may be performed by a network device (e.g., network device 105, 110). In some implementations, one or more process blocks of FIG. 5 may be performed by another device or a group of devices separate from or including the network device, such as a UE (e.g., UE 115, 301), a RAN (e.g., RAN 302), a core network (e.g., core network 303), an NSSF (e.g., NSSF 305), an NEF (e.g., NEF 310), an AUSF (e.g., AUSF 315), a UDM (e.g., UDM 320), a PCF (e.g., PCF 325), an AF (e.g., AF 330), an AMF (e.g., AMF 335), an SMF (e.g., SMF 340), a UPF (e.g., UPF 345), and/or a data network 355 (e.g., data network 355). Additionally, or alternatively, one or more process blocks of FIG. 5 may be performed by one or more components of device 400, such as processor 420, memory 430, input component 440, output component 450, and/or communication component 460. Additionally, or alternatively, one or more process blocks of FIG. 5 may be performed by one or more components of the second network device 110 described above in connection with FIG. 2H, such as the small cell 4G/5G layered stack 280, the KPI monitoring algorithm 282 component, the power controller 284, the interference component 286, the power amplifier 288, the radio layer component 290, and/or the antenna array 292.

As shown in FIG. 5, process 500 may include determining, based on powering up the network device, a first transmit power level associated with the cell (block 510). For example, the network device may determine, based on powering up the network device, a first transmit power level associated with the cell, as described above. In some implementations, process 500 includes measuring, by the network device and based on powering up the network device, interference associated with one or more other cells, wherein determining the first transmit power level associated with the cell is based on the interference associated with the one or more other cells.

As further shown in FIG. 5, process 500 may include monitoring one or more KPIs associated with a coverage of the cell (block 520). For example, the network device may monitor one or more KPIs associated with a coverage of the cell, as described above. In some implementations, the one or more KPIs includes at least one of an incomplete handover procedures KPI or an active connection drop KPI.

As further shown in FIG. 5, process 500 may include determining that at least one KPI, of the one or more KPIs, satisfies a threshold (block 530). For example, the network device may determine that at least one KPI, of the one or more KPIs, satisfies a threshold, as described above.

As further shown in FIG. 5, process 500 may include determining, based on the at least one KPI satisfying the threshold, that the first transmit power level should be adjusted (block 540). For example, the network device may determine, based on the at least one KPI satisfying the threshold, that the first transmit power level should be adjusted, as described above. In some implementations, process 500 includes determining whether a transmit power level associated with the cell is to be adjusted on a periodic basis.

As further shown in FIG. 5, process 500 may include adjusting the first transmit power level, resulting in a second transmit power level associated with the cell (block 550). For example, the network device may adjust the first transmit power level, resulting in a second transmit power level associated with the cell, as described above. In some implementations, the second transmit power level is lower than the first transmit power level, and, in some other implementations, the second transmit power level is higher than the first transmit power level. Additionally, or alternatively, process 500 may include determining, by the network device, a pattern associated with at least one of a time of day associated with the at least one KPI satisfying the threshold, or a day of the week associated with the at least one KPI satisfying the threshold. In such implementations, adjusting the first transmit power level may comprise adjusting, by the network device, the first transmit power level based on the pattern. Moreover, in some implementations, the one or more KPIs includes a first KPI and a second KPI, wherein adjusting the first transmit power level includes adjusting the first transmit power level as a function of a first factor and a second factor, wherein the first factor is a first product of a first weight and the first KPI, and wherein the second factor is a second product of a second weight and the second KPI.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining a first transmit power level for a cell;

monitoring, by a network device, a first key performance indicator (KPI) of one or more KPIs associated with a coverage of the cell;

determining, by the network device, whether the first KPI exceeds a threshold;

monitoring, by the network device, after waiting for a configurable amount of time, the first KPI, based on determining that the first KPI is not exceeding the threshold;

determining, by the network device, based on the first KPI exceeding the threshold, a pattern of failure occurrence associated with the first KPI; and adjusting, by the network device, the first transmit power level, resulting in a second transmit power level associated with the cell, based on the first KPI exceeding the threshold.

2. The method of claim 1, wherein the first KPI includes at least one of: an incomplete handover procedures KPI or an active connection drop KPI.

3. The method of claim 1, further comprising:

determining whether a transmit power level associated with the cell is to be adjusted on a periodic or scheduled basis.

4. The method of claim 1, further comprising:

measuring, by the network device, interference associated with one or more other cells, wherein determining the first transmit power level associated with the cell is based on the interference associated with the one or more other cells.

5. The method of claim 1, wherein the pattern of failure occurrence is determined based on at least one of: a time of day that the first KPI typically exceed a first threshold, or a day of the week that the first KPI typically exceed a second threshold.

6. The method of claim 1, wherein the one or more KPIs includes the first KPI and a second KPI, and wherein adjusting the first transmit power level includes adjusting the first transmit power level as a function of a first factor and a second factor, wherein the first factor is a first product of a first weight and the first KPI, and wherein the second factor is a second product of a second weight and the second KPI.

7. The method of claim 1, wherein adjusting the first transmit power level is based on at least one of: a KPI impact percentage, or the pattern of failure occurrence associated with the first KPI.

8. A network device, comprising:

one or more processors configured to:

determine a transmit power level associated with a cell associated with the network device, wherein the one or more processors are configured to determine an adjusted transmit power level based on:

a measured interference level associated with one or more neighboring cells;

a key performance indicator (KPI) monitoring algorithm, wherein the KPI monitoring algorithm is associated with the network device monitoring a first KPI of one or more KPIs associated with a coverage of the cell;

determining whether the first KPI exceeds a threshold;

monitoring, after waiting for a configurable amount of time, the first KPI, based on determining that the first KPI is not exceeding the threshold;

determining, based on the first KPI exceeding the threshold, a pattern of failure occurrence associated with the first KPI; and adjusting the transmit power level based on the first KPI exceeding the threshold; and transmit, to a user equipment (UE), a communication based on the adjusted transmit power level.

9. The network device of claim 8, wherein the first KPI includes at least one of an incomplete handover procedures KPI or an active connection drop KPI.

10. The network device of claim 8, wherein the one or more processors are further configured to:

determine, on a periodic or scheduled basis, whether the transmit power level is to be adjusted.

11. The network device of claim 8, wherein the pattern of failure occurrence is determined based on at least one of a time of day that the first KPI typically exceed a first threshold, or a day of the week that the first KPI typically exceed a second threshold.

12. The network device of claim 8, wherein the one or more KPIs includes the first KPI and a second KPI, and wherein the one or more processors, to determine the adjusted transmit power level associated with the cell, are further configured to determine the adjusted transmit power level as a function of a first factor and a second factor, wherein the first factor is a first product of a first weight and the first KPI, and wherein the second factor is a second product of a second weight and the second KPI.

13. The network device of claim 8, wherein the one or more processors, when adjusting the transmit power level, are configured to adjust based on at least one of: a KPI impact percentage, or the pattern of failure occurrence associated with the first KPI.

14. A non-transitory computer-readable medium storing a set of instructions, the set of instructions comprising:

one or more instructions that, when executed by one or more processors of a network device, cause the network device to:

measure an interference level associated with one or more cells;

determine, based on the interference level, a first transmit power level associated with a cell associated with the network device;

monitor a first key performance indicator (KPI) of one or more KPIs associated with a coverage associated with the cell;

determine whether the first KPI exceeds a threshold;

monitor, after waiting for a configurable amount of time, the first KPI, based on determining that the first KPI is not exceeding the threshold;

determine, based on the first KPI exceeding the threshold, a pattern of failure occurrence associated with the first KPI; and adjust the first transmit power level, resulting in a second transmit power level associated with the cell based on the first KPI exceeding the threshold.

15. The non-transitory computer-readable medium of claim 14, wherein the first KPI includes at least one of an incomplete handover procedures KPI or an active connection drop KPI.

16. The non-transitory computer-readable medium of claim 14, wherein the one or more instructions further cause the network device to determine whether a transmit power level associated with the cell is to be adjusted on a periodic or scheduled basis.

17. The non-transitory computer-readable medium of claim 14, wherein the one or more instructions further cause the network device to determine the second transmit power level based on the interference level associated with the one or more cells.

18. The non-transitory computer-readable medium of claim 14, wherein the pattern of failure occurrence is determined based on at least one of a time of day that the first KPI typically exceed a first threshold, or a day of the week that the first KPI typically exceed a second threshold.

19. The non-transitory computer-readable medium of claim 14, wherein the one or more KPIs includes the first KPI and a second KPI, and wherein the one or more instructions further cause the network device to determine the second transmit power level as a function of a first factor and a second factor, wherein the first factor is a first product of a first weight and the first KPI, and wherein the second factor is a second product of a second weight and the second KPI.

20. The non-transitory computer-readable medium of claim 14, wherein the one or more instructions, that cause the device to adjust the first transmit power level, cause the network device to adjust based on at least one of: a KPI impact percentage, or the pattern of failure occurrence associated with the first KPI.

* * * * *